US010579145B2

(12) United States Patent
Gustin

(10) Patent No.: US 10,579,145 B2
(45) Date of Patent: Mar. 3, 2020

(54) SIMULATING TOUCH IN A VIRTUAL ENVIRONMENT

(71) Applicant: eBay Inc., San Jose, CA (US)

(72) Inventor: Clayton Gustin, Round Rock, TX (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/001,347

(22) Filed: Jun. 6, 2018

(65) Prior Publication Data

US 2018/0284898 A1 Oct. 4, 2018

Related U.S. Application Data

(63) Continuation of application No. 15/878,844, filed on Jan. 24, 2018, now abandoned, which is a continuation of application No. 15/008,211, filed on Jan. 27, 2016, now Pat. No. 9,971,408.

(51) Int. Cl.
G06T 19/00 (2011.01)
G06F 3/01 (2006.01)

(52) U.S. Cl.
CPC .............. *G06F 3/016* (2013.01); *G06F 3/011* (2013.01); *G06T 19/006* (2013.01); *H05K 999/99* (2013.01)

(58) Field of Classification Search
CPC ........... G06F 3/016; G06F 3/011; G06F 1/163
USPC ........................................................ 345/633
See application file for complete search history.

(56) References Cited

U.S. PATENT DOCUMENTS

| 8,294,557 | B1 | 10/2012 | El Saddik et al. |
| 8,942,828 | B1 | 1/2015 | Schecter |
| 9,665,174 | B2 | 5/2017 | Osman |
| 9,741,216 | B1 | 8/2017 | Keller et al. |
| 9,971,408 | B2 | 5/2018 | Gustin |
| 2005/0012485 | A1* | 1/2005 | Dundon .................. G06F 3/011 318/568.11 |
| 2010/0141407 | A1* | 6/2010 | Heubel ................... G06F 1/163 340/407.1 |
| 2010/0261526 | A1 | 10/2010 | Anderson et al. |

(Continued)

FOREIGN PATENT DOCUMENTS

CN 102508562 A 6/2012
CN 203355211 U 12/2013

(Continued)

OTHER PUBLICATIONS

International Search Report received for PCT Application No. PCT/US2017/013925, dated Mar. 27, 2017, 2 pages.

(Continued)

*Primary Examiner* — Thomas J Lett
(74) *Attorney, Agent, or Firm* — Schwegman Lundberg & Woessner, P.A.

(57) ABSTRACT

In various example embodiments, a system and method for simulating touch in a virtual environment is disclosed. In one example embodiment, a system includes one or more circuits configured to receive an indicator of a sensed touch in a virtual environment and to determine, based on the indicator, an area of the sensed touch. The one or more circuits are further configured to generate a simulated touch by applying a ld to one or more touch simulators, the field actuating the one or more touch simulators by linearly displacing an element of the one or more touch simulators.

20 Claims, 16 Drawing Sheets

(56) References Cited

U.S. PATENT DOCUMENTS

| | | |
|---|---|---|
| 2010/0306120 A1 | 12/2010 | Ciptawilangga |
| 2011/0148607 A1 | 6/2011 | Zeleny |
| 2012/0142416 A1* | 6/2012 | Joutras ............... A63B 24/0006 463/36 |
| 2012/0200528 A1 | 8/2012 | Ciesta et al. |
| 2013/0155020 A1* | 6/2013 | Heubel ................. G06F 1/163 345/174 |
| 2013/0198625 A1* | 8/2013 | Anderson ............. G06F 3/016 715/701 |
| 2015/0145656 A1 | 5/2015 | Levesque et al. |
| 2015/0331483 A1 | 11/2015 | Cieszkowski, III et al. |
| 2016/0058657 A1 | 3/2016 | Lal et al. |
| 2016/0139666 A1 | 5/2016 | Rubin et al. |
| 2016/0220808 A1 | 8/2016 | Hyde et al. |
| 2016/0331631 A1 | 11/2016 | Odi |
| 2016/0374886 A1 | 12/2016 | Wyatt et al. |
| 2017/0079875 A1 | 3/2017 | Qiao |
| 2017/0212593 A1 | 7/2017 | Gustin |
| 2017/0272838 A1 | 9/2017 | Glazer et al. |

FOREIGN PATENT DOCUMENTS

| | | |
|---|---|---|
| CN | 107391020 A | 11/2017 |
| EP | 2624238 A1 | 8/2013 |
| WO | 2017/132025 A1 | 8/2017 |

OTHER PUBLICATIONS

International Written Opinion received for PCT Application No. PCT/US2017/013925 dated Mar. 27, 2017, 6 pages.

International Preliminary Report on Patentability and Written Opinion received for PCT Application No. PCT/US2017/013925, dated Aug. 9, 2018, 8 pages.

First Action Interview—Pre-Interview Communication received for U.S. Appl. No. 15/008,211, dated Nov. 2, 2016, 4 pages.

First Action Interview—Office Action Summary received for U.S. Appl. No. 15/008,211, dated Mar. 30, 2017, 7 pages.

Response to First Action Interview—Office Action Summary filed on Jun. 30, 2017 for U.S. Appl. No. 15/008,211 dated Mar. 30, 2017, 9 pages.

Notice of Allowance Received for U.S. Appl. No. 15/008,211, dated Oct. 17, 2017, 9 pages.

Corrected Notice of Allowability received for U.S. Appl. No. 15/008,211, dated Apr. 16, 2018, 5 pages.

Bowman et al., "Using Pinch Gloves(TM) For Both Natural and Abstract Interaction Techniques in Virtual Environments" Retrieved from the Internet URL: < http://people.cs.vt.edu/-bowman/papers/pinch_gloves.pdf>, 2001, 5 pages.

* cited by examiner

1100

SIMULATING TOUCH IN A VIRTUAL ENVIRONMENT

PRIORITY APPLICATION

This application claims priority to, and is a continuation of U.S. patent application Ser. No. 15/008,211, filed Jan. 27, 2016 (issued as U.S. Pat. No. 9,971,408 B2, and has a grant date of May 15, 2018) and U.S. patent application Ser. No. 15/878,844, filed Jan. 24, 2018, the disclosure of which is incorporated herein in its entirety by reference.

TECHNICAL FIELD

Embodiments of the present disclosure relate generally to virtual environments and, more particularly, but not by way of limitation, to simulating a touch from a virtual environment using a physical interface.

BACKGROUND

Conventionally, as a user interacts with a virtual environment, the user does not physically touch items in the virtual world. Instead, systems typically attempt to simulate touch using various methods.

In one example, a system attaches control arms to fingers in a glove. As the control arms cause the fingers to move, the user wearing the glove may sense a sort of touch, or resistance.

In another example, a system employs a set of inflatable air bags or pockets which, when inflated, may cause a touch sensation by the user, however, the resolution of such a system is limited in granularity and cannot simulate the texture of a touched thing in the virtual world.

BRIEF DESCRIPTION OF THE DRAWINGS

Various ones of the appended drawings merely illustrate example embodiments of the present disclosure and cannot be considered as limiting its scope.

Figure 1:
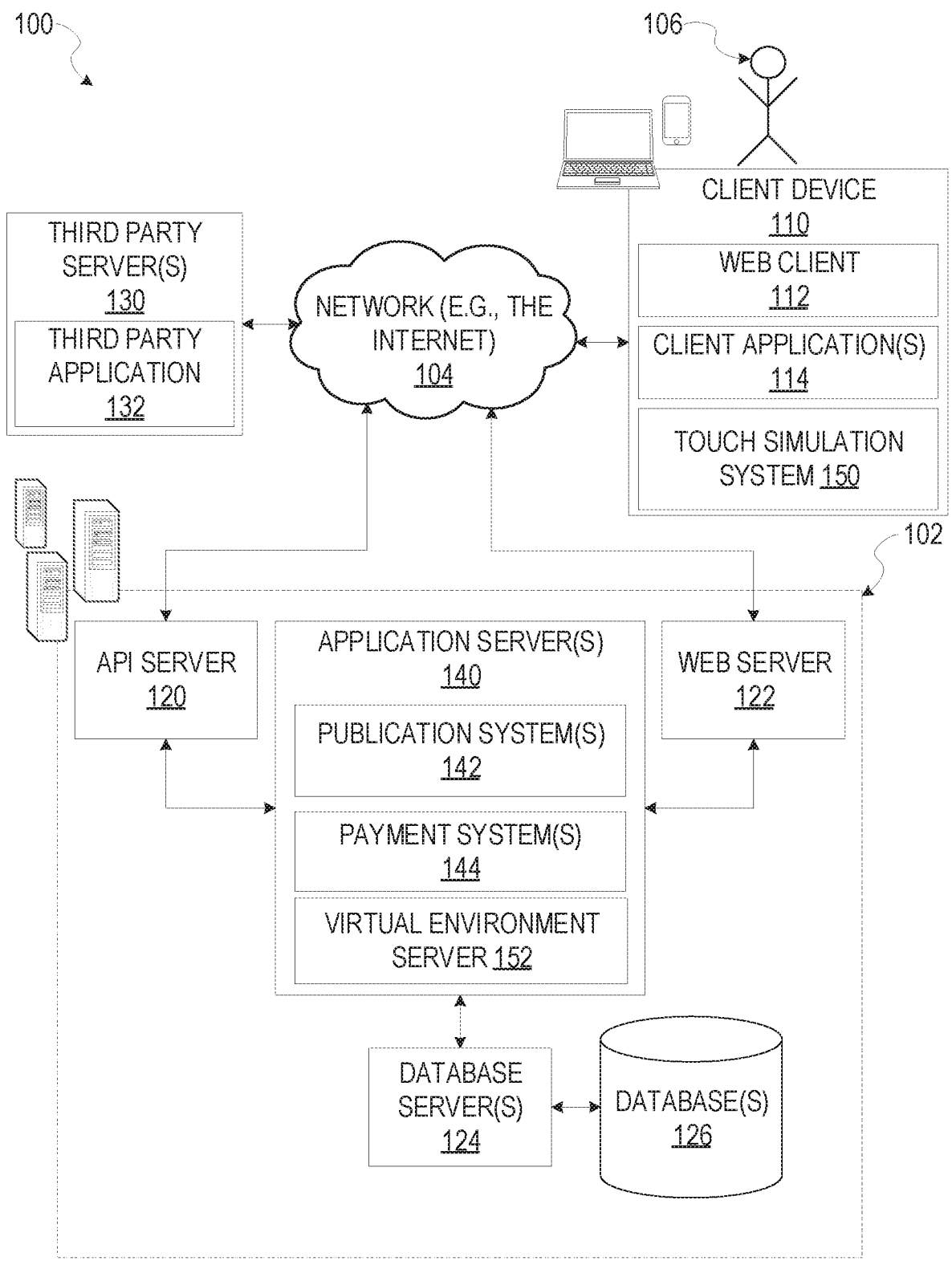
FIG. 1 is a block diagram illustrating a system, according to some example embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

In certain embodiments, a system as described herein, includes an array of micro-touch simulators embedded in an article of clothing. In one example, the micro-touch simulators operate as part of a glove. In certain example, a system applies respective electric fields to selected micro-touch simulators causing the micro-touch simulators to press against the skin of the user wearing the glove. In this way, the system can simulate a touch in a virtual environment.

In other example embodiments, micro-touch simulators are electrically charged micro-spheres that are actuated by the electric field applied. In one example, a different electrical field is applies to each of a set of micro-spheres in the article of clothing causing a different amount of pressure for respective micro-spheres. In one example embodiment, the micro-touch simulators are magnetic cylinders that are actuated by a magnetic field causing the micro-touch simulators to press against the skin of the user wearing the glove.

In this way, a touch simulation system can apply a wide range of different amounts of force in different areas. Accordingly, the touch simulation system is capable of simulating the texture of a touch as well as the simple location of the touch.

In one example, the micro-touch simulators approximately 10 microns in size allowing the touch simulation system to simulate any texture with a resolution of 10 microns or greater. In a specific example, the micro-touch simulators are stimulated in such a way so as to resemble snake skin because the texture of snake skin can be simulated using a resolution of 10 microns or greater.

In other examples, the micro-touch simulators are effected to simulate the texture of the individual scales as well as space between scales, ridges, protrusions, and other physical features of snake skin. In this way, a user may touch a snake in a virtual environment and the touch simulation system simulates the touch and feel of the snake using the glove. In this way, the physical experience of the user more closely resembles the virtual environment than with currently available techniques or methods.

In other examples, the touch simulation system simulates a dynamic touch that moves across the user's skin. By activating iterative sets of micro-touch simulators, the touch simulation system can simulate a touch moving across the user's skin as will be further described. In another example, the touch simulation system simulates rubbing, scratching, pinching, and other more complex tactile sensations.

With reference to FIG. 1, an example embodiment of a high-level client-server-based network architecture 100 is shown. A network system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), client application(s) 114, and a touch simulation system 150 as will be further described, executing on the client device 110.

In one example embodiment, a portion of the touch simulation system 150 is implemented as executable code operating at the client device 110. For example, the portion of the touch simulation system 150 may be connected to an array of micro-touch simulators configured to operate as part of an article of apparel and simulate various touches described herein by activating a set of micro-touch simulators in the apparel.

The client device 110 may comprise, but is not limited to, a mobile phone, desktop computer, laptop, personal digital assistant (PDA), smart phone, tablet, ultra book, netbook, laptop, multi-processor system, microprocessor-based or programmable consumer electronics, game console, set-top box, or any other communication device that a user may utilize to access the network system 102. In some embodiments, the client device 110 may comprise a display module (not shown) to display information (e.g., in the form of user interfaces). In further embodiments, the client device 110 may comprise one or more of a touch screen, accelerometer, gyroscope, camera, microphone, global positioning system (GPS) device, and so forth. The client device 110 may be a device of a user that is used to perform a transaction involving digital items within the network system 102. In one embodiment, the network system 102 is a network-based marketplace that responds to requests for product listings, publishes publications comprising item listings of products available on the network-based marketplace, and manages payments for these marketplace transactions.

One or more users 106 may be a person, a machine, or other means of interacting with the client device 110. In embodiments, the user 106 is not part of the network architecture 100, but may interact with the network architecture 100 via the client device 110 or another means. For example, one or more portions of the network 104 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given client device 110, then this application is configured to locally provide the user interface and at least some of the functionalities with the application configured to communicate with the network system 102, on an as needed basis, for data and/or processing capabilities not locally available (e.g., access to a database of items available for sale, to authenticate a user, to verify a method of payment, etc.). Conversely, if the e-commerce site application is not included in the client device 110, the client device 110 may use its web browser to access the e-commerce site (or a variant thereof) hosted on the network system 102.

In example embodiments, the user 106 is not part of the network architecture 100, but may interact with the network architecture 100 via the client device 110 or other means. For instance, the user 106 provides input (e.g., touch screen input or alphanumeric input) to the client device 110 and the input is then communicated to the network system 102 via the network 104. In this instance, the network system 102, in response to receiving the input from the user 106, communicates information to the client device 110 via the network 104 to be presented to the user 106. In this way, the user 106 can interact with the network system 102 using the client device 110.

An application program interface (API) server 120 and a web server 122 are coupled to, and provide programmatic and web interfaces respectively to, one or more application server(s) 140. The application server(s) 140 may host one or more publication systems 142 and payment systems 144, each of which may comprise one or more modules or applications and each of which may be embodied as hardware, software, firmware, or any combination thereof. The application server(s) 140 are, in turn, shown to be coupled to one or more database servers 124 that facilitate access to one or more information storage repositories or database(s) 126. In an example embodiment, the database(s) 126 are storage devices that store information to be posted (e.g., publications or listings) to the publication system(s) 142. The database(s) 126 may also store digital item information in accordance with example embodiments.

In one example embodiment, the virtual environment server 152 manages a virtual environment. As one skilled in the art may appreciate, a virtual environment, in one example, digitally simulates a physical space. The virtual environment, in this example, is displayed to the person 106 using a pair of virtual environment goggles 230. The goggles 230 display the virtual environment to the person 106 and responds to the person's 106 movements. In this way, the person 106 may interact with objects represented in the virtual environment. Of course, the virtual environment may represent any physical scenario and this disclosure is not limited in this regard.

In certain example embodiments, the virtual environment simulates any of the following: a battle scenario, a physical training exercise, a swordfight, a gunfight, a military exercise, a gaming scenario, fighting a dragon, a shopping scenario, viewing and/or touching an item, or the like.

A third party application 132, executing on third party server(s) 130, is shown as having programmatic access to the network system 102 via the programmatic interface provided by the API server 120. For example, the third party application 132, utilizing information retrieved from the network system 102, supports one or more features or functions on a website hosted by the third party. The third party website, for example, provides one or more promotional, marketplace, or payment functions that are supported by the relevant applications of the network system 102.

In one example embodiment, an application server is a virtual environment server 152. In this example, the virtual environment server 152 manages a virtual environment. In certain example, the virtual environment server 152 generates the virtual environment based, at least in part, on input from any other application server 140. In one example, the publication system 142 transmits physical properties of an item including size, color, dimensions, shape, texture, and the like. In response, the virtual environment server 152, according to one example embodiment, generates a virtual environment that includes the item. In other example embodiment, the virtual environment server 152 generates a virtual environment that includes the item. In one example, the virtual environment is a table with the item resting thereon. In this example embodiment, a user interacting with the virtual environment may approach the table and virtually touch and/or feel the item although the user may be at a remote location.

The publication system(s) 142 may provide a number of publication functions and services to users 106 that access the network system 102. The payment system(s) 144 may likewise provide a number of functions to perform or facilitate payments and transactions. While the publication system(s) 142 and payment system(s) 144 are shown in FIG. 1 to both form part of the network system 102, it will be appreciated that, in alternative embodiments, each system 142 and 144 may form part of a payment service that is separate and distinct from the network system 102. In some embodiments, the payment system(s) 144 may form part of the publication system(s) 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various publication system(s) 142, payment system(s) 144, and touch simulation system 150 could also be implemented as standalone software programs, which do not necessarily have networking capabilities.

The web client 112 may access the various publication and payment systems 142 and 144 via the web interface supported by the web server 122. Similarly, the touch simulation system 150 may communicate with the network system 102 via a programmatic client. The programmatic client accesses the various services and functions provided by the publication and payment systems 142 and 144 via the programmatic interface provided by the API server 120. The programmatic client may, for example, be a seller application (e.g., the Turbo Lister application developed by eBay® Inc., of San Jose, Calif.) to enable sellers to author and manage listings on the network system 102 in an off-line manner, and to perform batch-mode communications between the programmatic client and the network system 102.

Additionally, a third party application(s) 132, executing on a third party server(s) 130, is shown as having programmatic access to the network system 102 via the programmatic interface provided by the API server 120. For example, the third party application 132, utilizing information retrieved from the network system 102, may support one or more features or functions on a website hosted by the third party. The third party website may, for example, provide one or more promotional, marketplace, or payment functions that are supported by the relevant applications of the network system 102.

Figure 2:
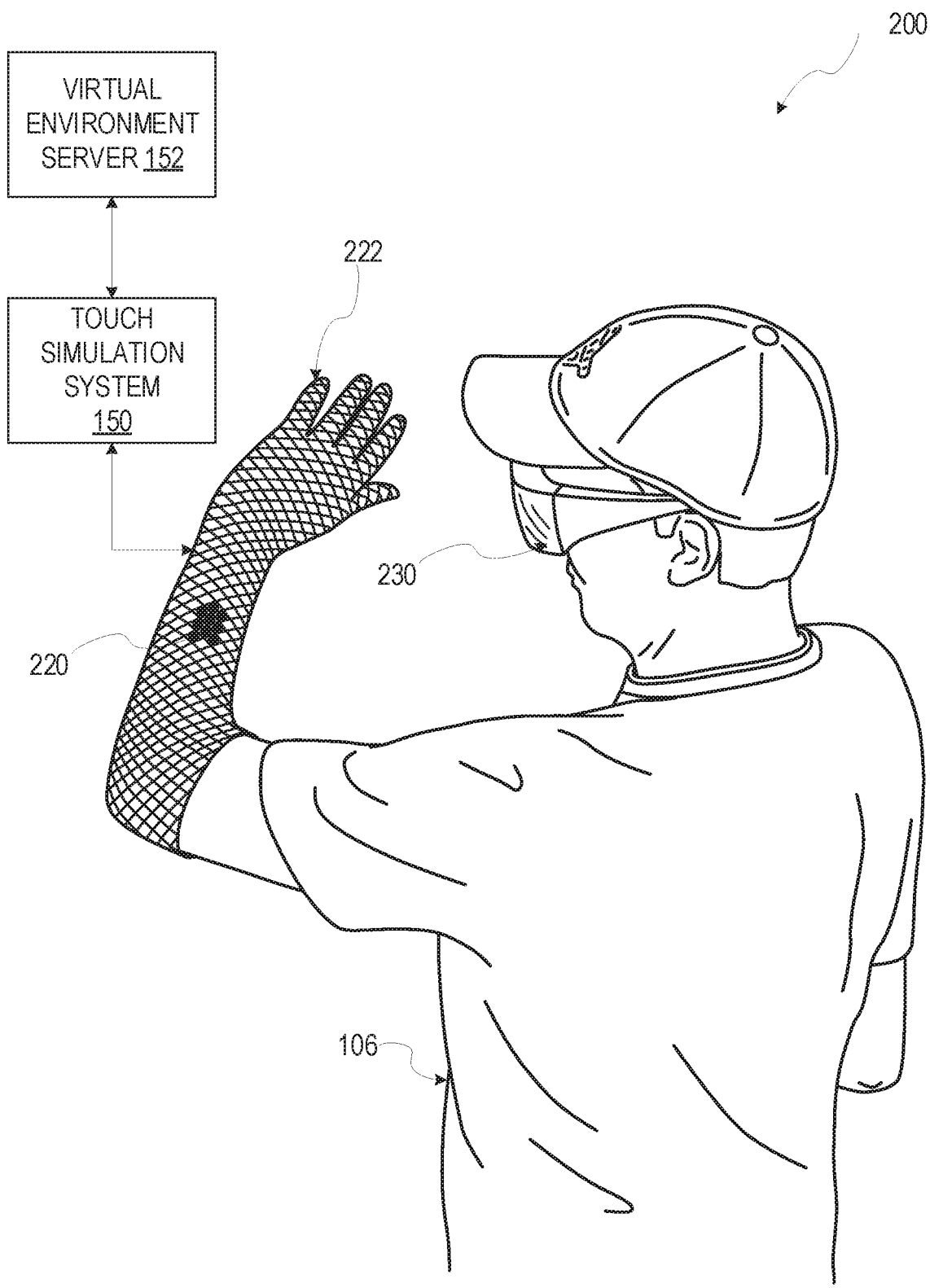
FIG. 2 is an illustration depicting a touch simulation system, according to one example embodiment.

FIG. 2 is an illustration depicting a touch simulation system, according to one example embodiment. In this example embodiment, the system 200 includes the virtual environment server 152, the touch simulation system 150, and a glove 222 that includes an array of micro-touch simulators.

In one example embodiment, the virtual environment, generated by the virtual environment server 152 including an object that touches the person 106 on the forearm indicated by the touch location 220. In one example, in the virtual environment, the person 106 is blocking a sword with the sword contacting the person 106 at the location on the person's forearm.

In this example, the virtual environment server 152 transmits an indication of the touch to the touch simulation system 150. The indication defines the touch in the virtual environment. Furthermore, in other example embodiments, the indication indicates a physical touch location 220.

In one example, the touch simulation system is calibrated to generate a map between certain micro-touch simulators and certain locations on the article of apparel. In this example, calibrating the glove yields a map such that the touch simulation system 150 can determine which micro-touch simulators to activate in response to a touch from the virtual environment server 152.

In one example embodiment, the touch indication further includes a texture of the thing being touched. As will be further described, the touch simulation system 150, in certain embodiments, also simulates the indicated texture. By activating certain micro-touch simulators according to the texture, the touch simulation system 150 generates the touching sensation consistent with the indicated texture. In this way, the touch simulation system 150 simulates the touch as well as the texture of the touch. In one example, the touch in the virtual environment includes the person 106 touching dragon skin and the touch simulations system 150 activates the micro-touch simulators to simulate dragon skin.

In one example embodiment, the touch simulation system 150 includes a database of textures. In response to receiving a touch that includes a touch texture, the touch simulations system 150 loads the indicated touch texture form the database and generates a command to simulate the texture of the touch at the physical touch location 220.

In one example embodiment, the touch simulation system applies respective electrical fields to a set of micro-touch simulators causing the micro-touch simulators to contact the skin of the person 106 wearing the article of apparel that includes the array of micro-touch simulators. In this example, the micro-touch simulators are electrically charged microspheres. In another example, the touch simulation system applies respective magnetic fields to a set of micro-touch simulators that are magnetic cylinders to simulate a texture. Example textures are indicated in FIGS. 5A-5D.

In another example embodiment, the touch simulation system also applies a temperature at the physical touch location 220. In one example embodiment, the touch simulation system 150 sends current through an electrical circuit to heat the area of the physical touch location 220. In another example, the touch simulation system 150 powers a Peltier cooler to cool the area of the physical touch location 220. Of course, the touch simulation system 150 may effect temperature in any other way as one skilled in the art may appreciate.

Figure 3:
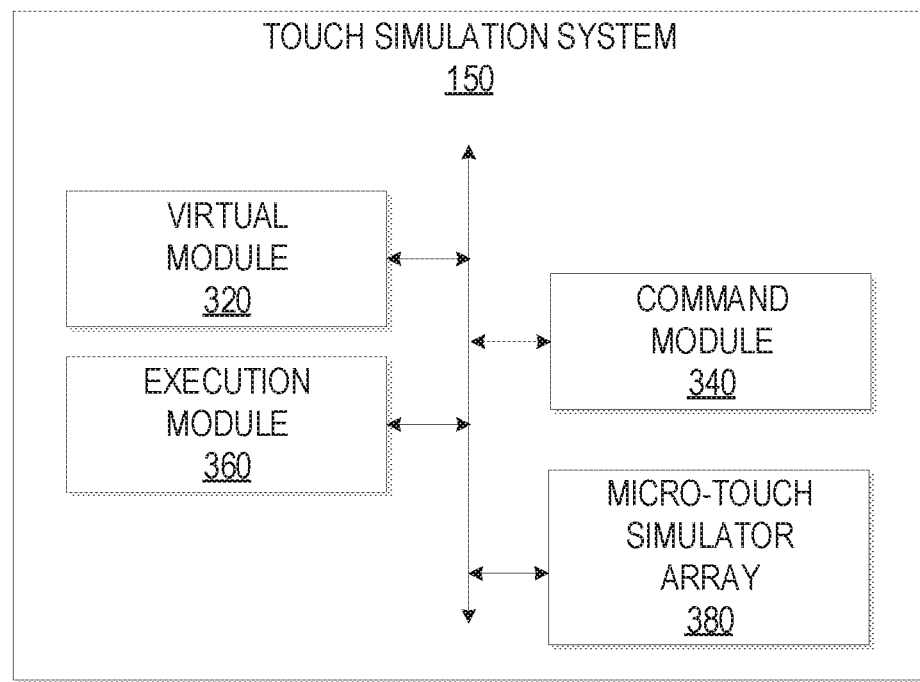
FIG. 3 is a block diagram illustrating one example embodiment of a touch simulation system.

FIG. 3 is a block diagram illustrating one example embodiment of a touch simulation system. In one example embodiment, the system 300 includes a micro-touch simulator array 380, a virtual module 320, a command module 340, and an execution module 360.

In one example embodiment, the micro-touch simulator array 380 is configured in an article of apparel. In one example, the apparel is included in a hat, glove, shirt, pants, dress, belt, suit, full-body suit, mask, or any other article configured to be within a proximity to the skin of the person 106 so as to be able to contact the skin of the person 106 as commanded to do so by the touch simulation system 150.

In one example embodiment, the micro-touch simulators each include a charged microsphere that is movable to contact the skin of the person 106 that is wearing the article of apparel. In one example embodiment, the micro-touch simulators each include a magnetic cylinder that is similarly movable. In another example embodiment, the charged microspheres are insulated from each other using an insulator as one skilled in the art may appreciate. In this way, an electrical field is applied to one of the micro-spheres does not move another microsphere that neighbors the microsphere being moved. In this way, each of the microspheres in the array may be moved independently. Similarly, the magnetic cylinders may be moved independently by respective application of magnetic fields at the micro-touch simulators as described herein.

In one example embodiment, the virtual module 320 is configured to receive an indicator of a virtual touch in a virtual environment, the indicator indicating a physical touch location on the article of apparel and a texture of the physical touch.

In one example, the person 106 is represented in a virtual environment. In response to a virtual thing touching the representation of the person 106 in the virtual environment, the virtual environment server 152 determines a location of a touch on the represented person 106. In response, the virtual environment server 152 transmits a message to the virtual module 320 that indicates a corresponding physical location of a physical touch to be simulated on the person 106.

In one example, the virtual environment 152 and the article of apparel are calibrated so as to generate a mapping of virtual locations on a represented person 106 in the virtual environment and corresponding locations on the article of apparel. In this way, the virtual module 320 can determine a physical location to simulate a touch based, at least in part, on a virtual location of a touch in the virtual environment. In one example, each of the micro-touch simulators are numbered and the mapping associates virtual locations with specific numbered micro-touch simulators.

In another example embodiment, the indicator includes a force of the touch. In response, the virtual module 320 adjusts the signal to the micro-touch simulators to simulate the force of the touch. In one example, the micro-touch simulators are electrically charged micro-spheres and the virtual module 320 increases the electrical field to move the charged micro-sphere in response to an increased force of the touch. In another example, the micro-touch simulators are magnetic cylinders and the virtual module 320 increases the magnetic field to move the cylinders causing increased force against the person's 106 skin. In another example, the virtual module 320 decreases the electrical field to move the charged micro-sphere in response to a decreased force of the touch.

In one example, the person 106 and an item that is available for purchase are represented in a virtual environment. Based on physical movements by the person 106 in the physical world, a representation of the person 106 in the virtual environment may touch an item that is available for sale. In response to the touch, the virtual environment server may transmit an indicator to the virtual module 360 that identifies the location of the touch in the virtual environment and corresponding micro-touch simulators in the article of apparel being worn by the person 106 in the physical world.

In another example embodiment, the indicator identifies an area of the touch and a texture of the touch to be simulated in the area. Similarly, as with the location of the touch the virtual module 320 may identify which micro-touch simulators to activate in the article of apparel according to the texture of the touch as described herein.

In one example embodiment, the command module 340 is configured to generate a command that simulates the texture of the physical touch at the physical touch location by applying respective electric fields to a plurality of micro-touch simulators causing a plurality of the micro-touch simulators to touch the user according to the texture.

As will be further described regarding FIGS. 5A-5D, the touch indicator may indicate a wide variety of different textures. As one skilled in the art may appreciate, a texture includes a pattern of high and low areas at a surface. In one example embodiment, the command module 340 generates one or more commands to move one or more micro-touch simulators to represent the texture indicated by the indicator received from the virtual environment server 152. In certain embodiments, the texture includes varying levels of being bumpy, smooth, coarse, fine, slippery, rough, or other, or the like. In one example embodiment, each level of each texture is stored in a database of textures.

In one example embodiment, the touch indicator indicates a part of the apparel being worn by the person 106 and the touch indicator also indicates two nearby locations of the apparel. In this example, the touch indicator includes two distinct touches to simulate a pinching experience at the physical touch location. In response to receiving In another example, the touch indicator indicates a two locations at opposing sides of the apparel. In this example, the touch indicator includes two distinct touches to simulate a grabbing experience at the physical touch location. In response, the command module 340 generates a command that stimulates portions of the micro-touch simulator array according to the distinct touches.

In one example embodiment, the touch indicator indicates a beginning touch location, and end touch location, and a location move speed. In response, the command module 340 stimulates a sequence of portions of the micro-touch simulators to simulate the touch moving from the beginning touch location to the end touch location. In this way, the command module 340 generates a command that simulates a scratching experience by the person 106.

In another example embodiment, the execution module is configured to execute the command(s) generated by the command module to cause the specified micro-touch simulators to touch the user according to the texture as described herein.

In one example embodiment, the virtual environment server 152 may detect that representation of the person 106 in the virtual environment has moved such that the touch no longer represents what is occurring in the virtual environment. In response, the virtual environment server 152 transmits another indicator to the execution module 360 to indicate that the touch is no longer occurring in the virtual environment. In response, and in order to accurately reflect the state of objects in the virtual environment, the execution module suspends simulating the touch. In one example, the execution module causes each of the micro-touch simulators to move away from touching the person 106. In one example where the micro-touch simulators are electrically charged microspheres, the execution module 360 stops the flow of current to the array of microspheres such that they relocate to a natural position (in the absence of an electrical field). In another example, the micro-touch simulators are magnetic cylinders, and the execution module 360 stops the flow of current to the array of magnetic cylinders such that the cylinders relocate to a natural position.

In one example, the magnetic cylinders are mechanically held in the natural position using a spring. In another the magnetic cylinders are held in the natural position using a stretchable material. In this example, application of magnetic field presses the cylinder against the stretchable material to press against the person's 106 skin.

Figure 4:
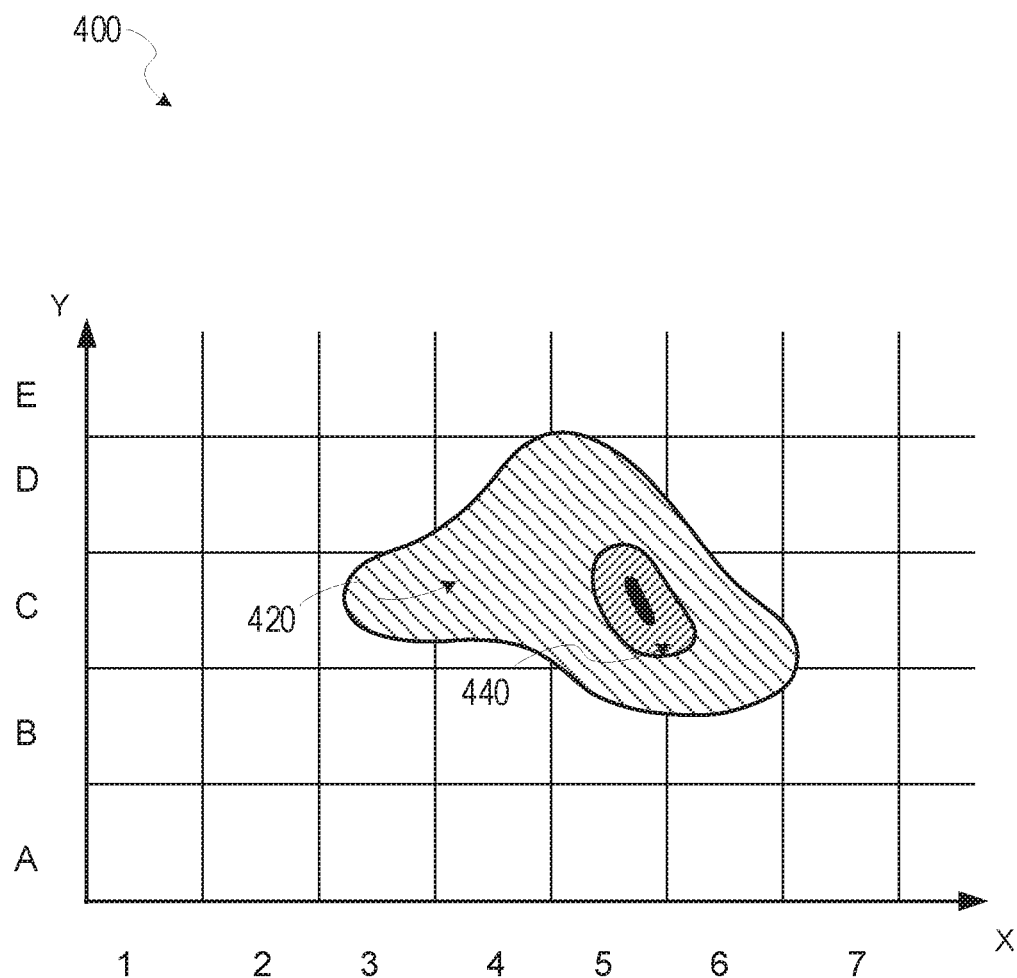
FIG. 4 is a plot depicting various force levels for a touch according to one example embodiment.
Figure 5:
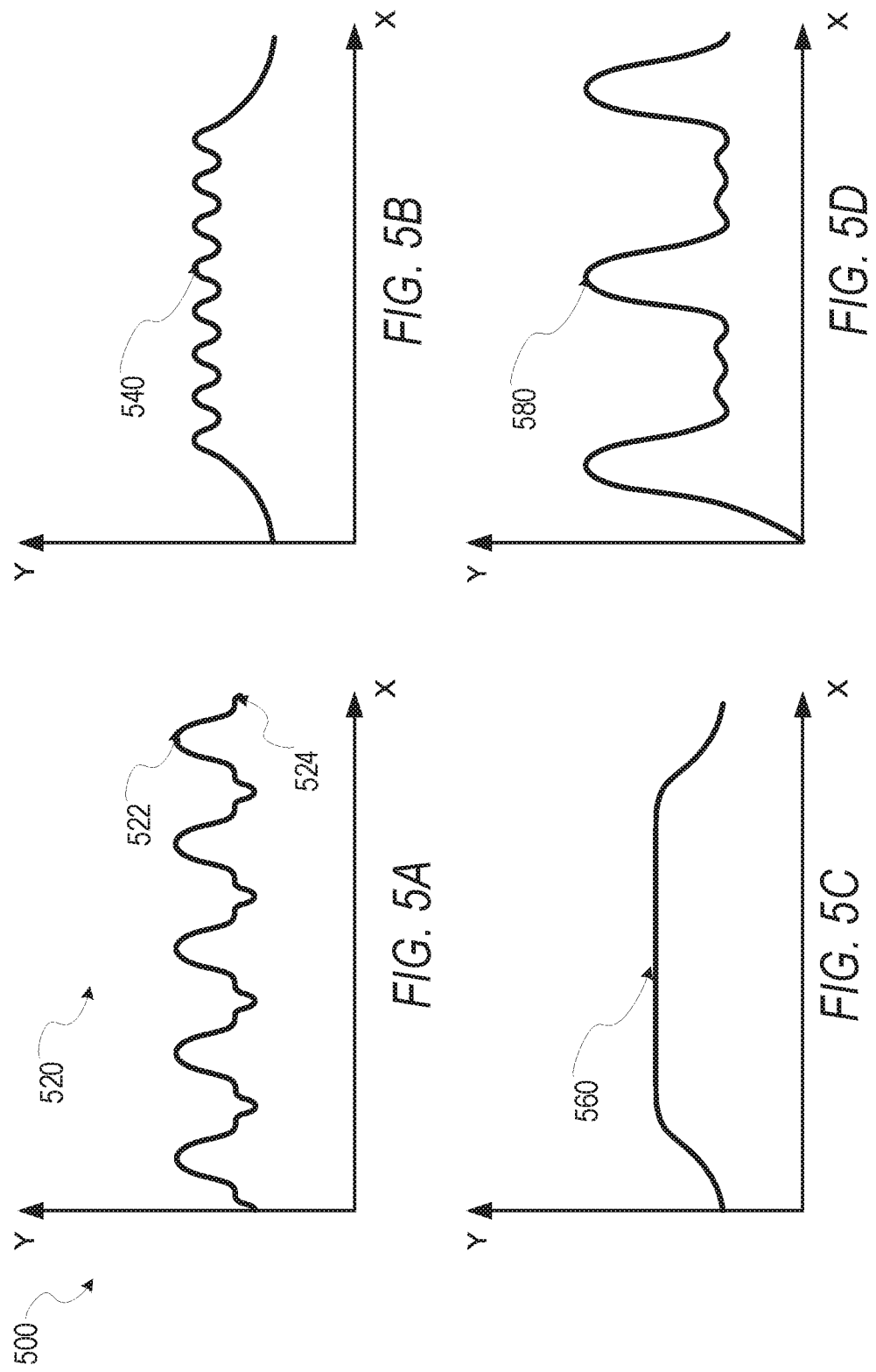
FIG. 5A is a chart depicting a touch texture according to one example embodiment.
FIG. 5B is a chart depicting another touch texture according to one example embodiment.
FIG. 5C is a chart depicting a touch texture according to another example embodiment.
FIG. 5D is a chart depicting a touch texture according to one example embodiment.

FIG. 4 is a plot 400 depicting various force levels for a touch according to one example embodiment. In this example embodiment, the touch indicator indicates different areas for different force levels.

In one example, the virtual module 320 receives the touch indicator and the command module 340 generates a command causing micro-touch simulators at locations C-3, D-4, C-4, D-5, and C-6 at a first force level 420, and micro-touch simulators at location C-5 at a second (and higher) force level 440. According to the plot of force levels, the command module 340 may generate one or more commands causing the micro-touch simulators to move into contact with the person's 106 skin as indicated in the plot 400.

In one example, the command module 340 generates a command that specifies an increased force by applying an increased electrical field to physically move an electrically charged micro-sphere operating as part of a micro-touch simulator. In another example, the command module 340 generates a command that specified an increased magnetic field to physically move a magnetic cylinder operating as part of a micro-touch simulator.

FIG. 5A is a chart 520 depicting a touch texture according to one example embodiment. In this example embodiment, the touch indicator indicates a texture comprising equally spaced bumps and a specific height between the tops 522 of the bumps and the bottoms 524 of the bumps. A distance between the bumps feels like a certain texture to a person 106. In one specific example, the height difference is 100 microns.

In another example embodiment, the texture is a three dimensional surface and the command module 340 generates a command to move one or more micro-touch simulators into contact with the person's 106 skin based on the surface plot.

FIG. 5B is a chart depicting another touch texture according to one example embodiment. In this example embodiment, the touch indicator indicates a texture comprising equally spaced bumps and a specific height between the tops of the bumps and the bottoms of the bumps. A distance between the bumps feels like a certain texture to a person 106. As compared with FIG. 5A, the height differential between the tops and bottoms is less. In one example, the height difference is 50 microns.

FIG. 5C is a chart depicting a touch texture according to another example embodiment. In this example embodiment, the touch indicator indicates a texture comprising a level surface. In this example, neighboring micro-touch simulators are moved by the execution module 380 to similar heights. This texture will feel quite smooth to the person 106 because there are no bumps to catch a surface that comes into contact with the texture.

FIG. 5D is a chart depicting a touch texture according to one example embodiment. In this example embodiment, the touch indicator indicates a texture comprising equally spaced bumps and a specific height between the tops of the bumps and the bottoms of the bumps. As compared with FIG. 5A, the height differential between the tops and bottoms is more. In one example, the height difference is 500 microns. This texture may feel rough to the person 106.

Figure 6:
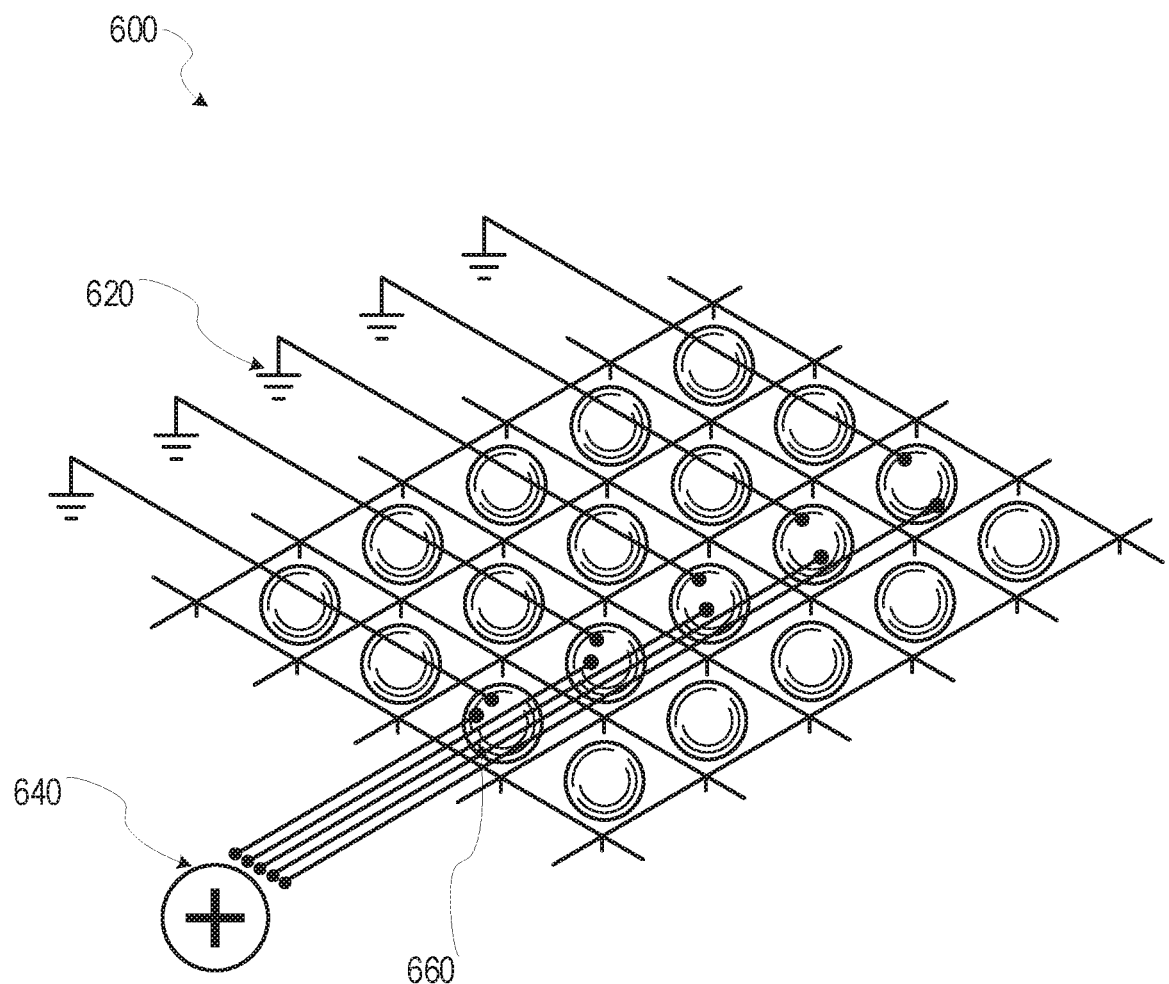
FIG. 6 is an illustration depicting an array of touch simulators according to one example embodiment.

FIG. 6 is an illustration depicting an array of touch simulators according to one example embodiment. In this example embodiment, the micro-touch simulators are electrically charged micro-spheres 660. In one example, the electrically charged microspheres are between 10 and 30 microns in size. According to one example, such a size of between 10 and 30 microns will feel smooth to a person 106 in response to adjacent micro-spheres being moved together.

According to one example embodiment, the electrically charged micro-spheres are set in an array and placed near electrical connectors. In one example, electrical connects connect from a power source 640 and a ground 620. In one example, an electrical potential may be applied from the power source in a coil of wire creating an electrical field which moves the electrically charged micro-sphere as one skilled in the art may appreciate. In another example, a command causes current to flow through a coil of wire creating a magnetic field which moves a magnetic cylinder as one skilled in the art may appreciate.

In one example embodiment, the micro-spheres are electrically charged during a manufacturing process or a calibration process. In one example, the micro-spheres are negatively charged and the electrical connections generate an electrical field via a coil which repels the negatively charged micro-sphere. In another example embodiment, a separate power source may be configured for each micro-sphere. In this way, each electrically charged micro-sphere may be moved independently. In one example embodiment, the array of micro-spheres further includes means for altering a temperature at each micro-sphere as described herein.

Figure 7:
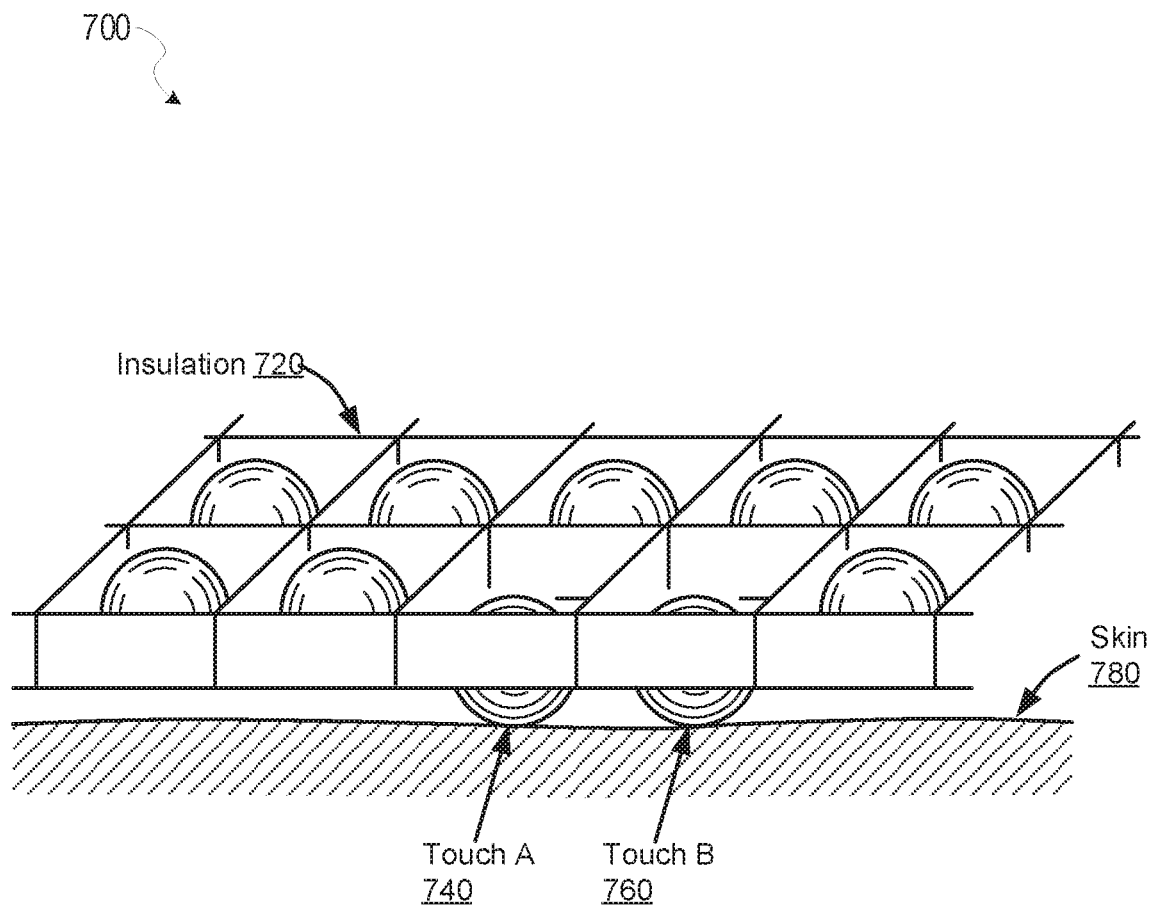
FIG. 7 is another illustration depicting an array of touch simulators according to one example embodiment.

FIG. 7 is another illustration depicting an array 700 of touch simulators according to one example embodiment. In one example embodiment, the micro-touch simulators may be electrically isolated (e.g., using insulation 720) such that an electrical field applied to one of the micro-touch simulators does not affect another of the micro-touch simulators.

In this way, the execution module 380 can move a micro-touch simulator for touch A and a separate micro-touch simulator for touch B to touch the person's 106 skin without moving other micro-touch simulators in the array 700.

In another example embodiment, an insulator is placed between each of the micro-touch simulators and the skin 780 of the person 106 so that an electrical charge associated with the micro-touch simulator is not dissipated.

Figure 8:
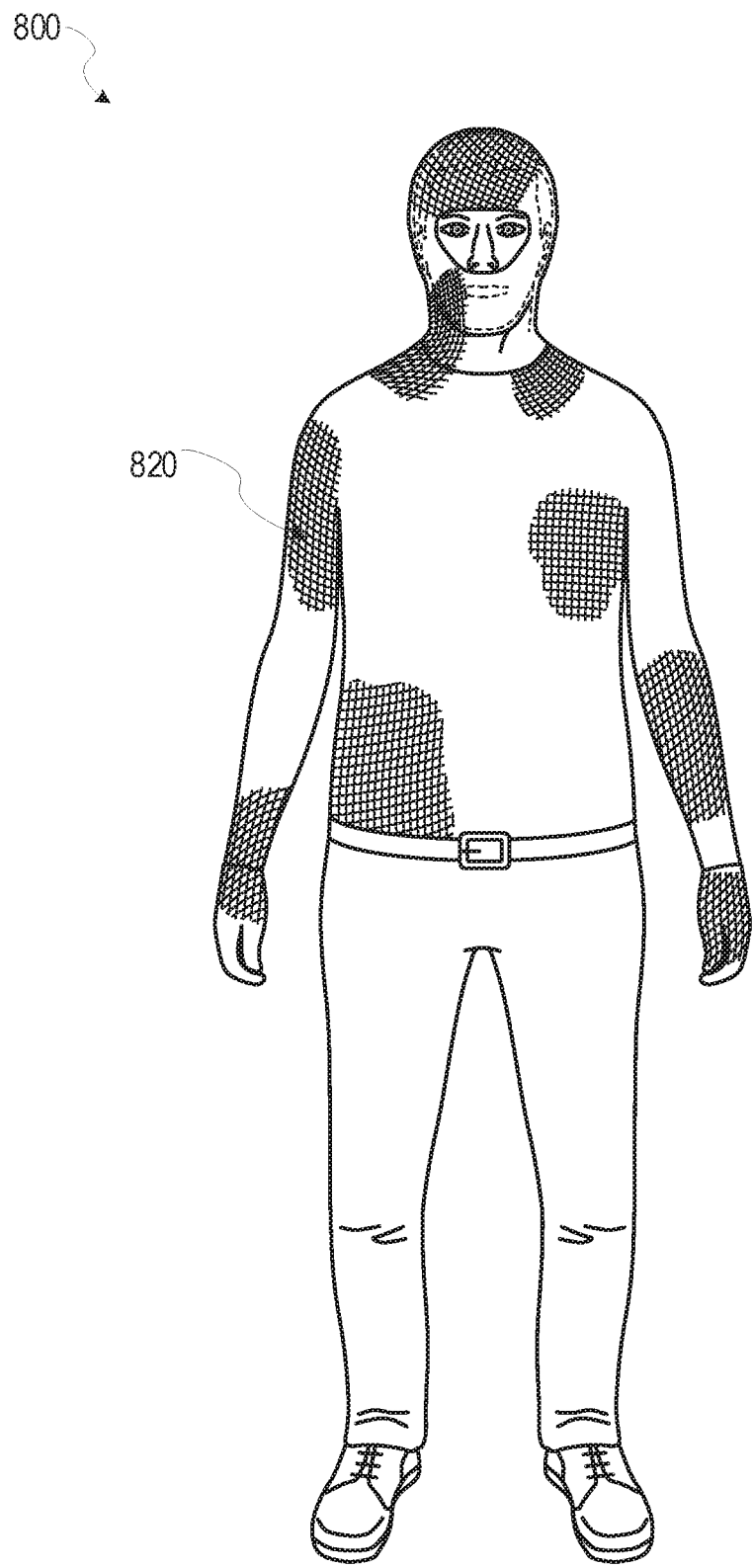
FIG. 8 is an illustration depicting a touch suit according to one example embodiment of a touch simulation system.

FIG. 8 is an illustration depicting a touch suit 800 according to one example embodiment of a touch simulation system. In one example embodiment, the person 106 wears the touch suit 800 and the touch suit 800 fits snugly against the person's 106 skin.

In one example embodiment, the virtual environment is a sword fight. In response to the representation of the person 106 in the virtual environment being hit by a sword, the virtual environment server 152 generates a touch indicator and transmits the touch indicator to the virtual module 320.

In response, the command module 340 generates a command that causes one or more of the micro-touch simulators to touch the skin of the person 106 consistent with the location of the sword in the virtual environment. Because the person is wearing a body suit 800, the sword in the virtual environment may touch the representation of the person 106 anywhere and the touch may be simulated on a corresponding location on the body suit. In this way, the person 106 may experience a full battle experience and may be virtually hit by a sword almost anywhere that is covered by the body suit 800.

In another example embodiment, the representation of the person 106 is shot by a gun and the touch simulation system 150 causes small section of micro-touch simulators to contact the person 106 consistent with the size of the bullet used in the virtual environment. In other examples, a body suit 800 may be used to simulate military training, police training, martial arts training, or the like.

In another, more fantasy scenario, the virtual environment may be the person 106 fighting a dragon and the touches by the dragon in the virtual environment are simulated using the body suit. In this way, the user feels when and where the dragon has touched the person 106. Providing real-time touch simulation for the user in a virtual environment may heighten the perception of realism for the person 106.

Figure 9:
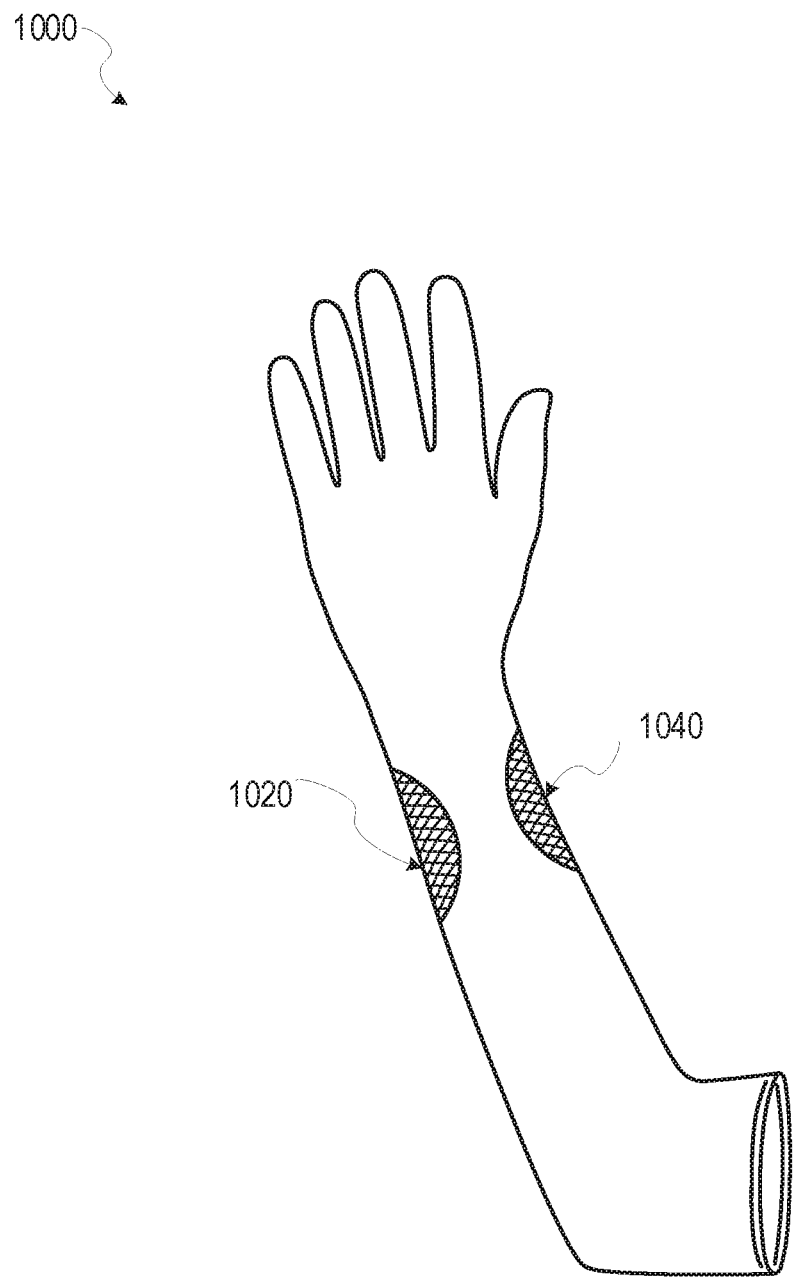
FIG. 9 is an illustration depicting a physical touch according to one example embodiment.

FIG. 9 is an illustration depicting a physical touch according to one example embodiment. In another example, the touch indicator indicates a two locations at opposing sides of the apparel. In this example, the touch indicator includes two distinct touches (e.g., touch 1020, and a touch 1040 to simulate a grabbing experience at the physical touch location.

In one example, the touches simulate a dog bite by moving one or more micro-touch simulators according to an arrangement of teeth for a dog. Furthermore, as the texture of teeth are applied to both sides of the article of apparel, the person 106 experience a simulated dog bite.

In another example embodiment, the touches simulate a grabbing experience for the person 106. For example, the texture of the touch may be consistent with a person's skin and the touches 1020 and 1040 may wrap more around the arm of the person 106. In this way, the person 106 feels as though his/her arm has been grabbed by another person.

Figure 10:
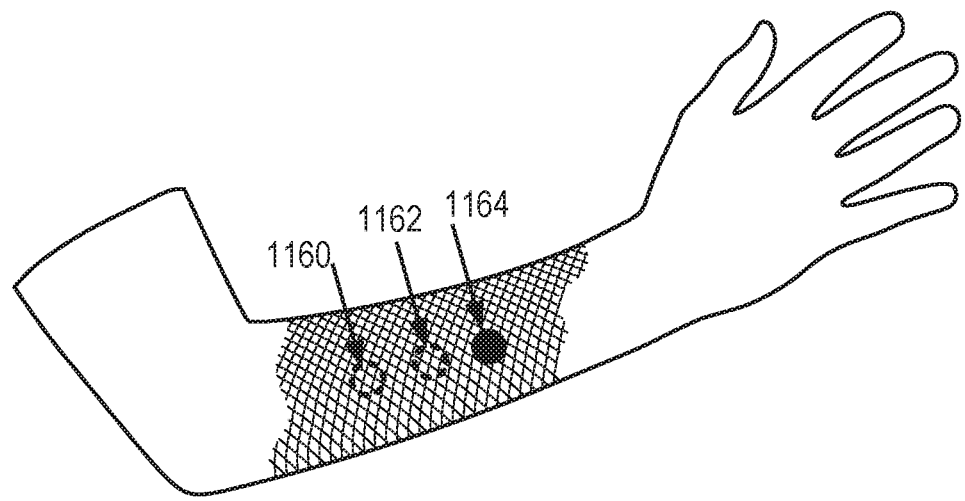
FIG. 10 is an illustration depicting a dynamic touch according to one example embodiment.

FIG. 10 is an illustration depicting a dynamic touch according to one example embodiment. According to this example embodiment, the command module 340 generates a command that activates sequential portions of the array of micro-touch simulators to simulate the touch moving across the person's skin.

In one example embodiment, the command module 340 generates a command that activates touch 1160, then activates a touch at location 1162, then activates touch at location 1164. In this example, the person 106 may feel as though the touch is moving from location 1160 to location 1164.

In one example, the command module 340 generates a command that activates the respective touches (1160, 1162, and 1164) at 250 millisecond intervals. Of course, other times may be used and this disclosure is not limited in this regard.

In another example embodiment, the representation of the person 106 in the virtual environment is holding sand in his/her hand. In response to the person 106 expanding his/her fingers allowing the sand to fall through, the command module 340 generates one or more commands to causing touching at the sides of the fingers and moving down. In this way, the touch simulation system can simulate the experience of letting sand fall through the fingers. In another example, in response to the person 106 physically closing his/her fingers, the virtual environment server 152 indicates that the sand sifting touches are no longer occurring and may transmit an indicator to the virtual module to indicate accordingly. In response, the execution module 360 suspends execution of the sand sifting touching commands.

Figure 11:
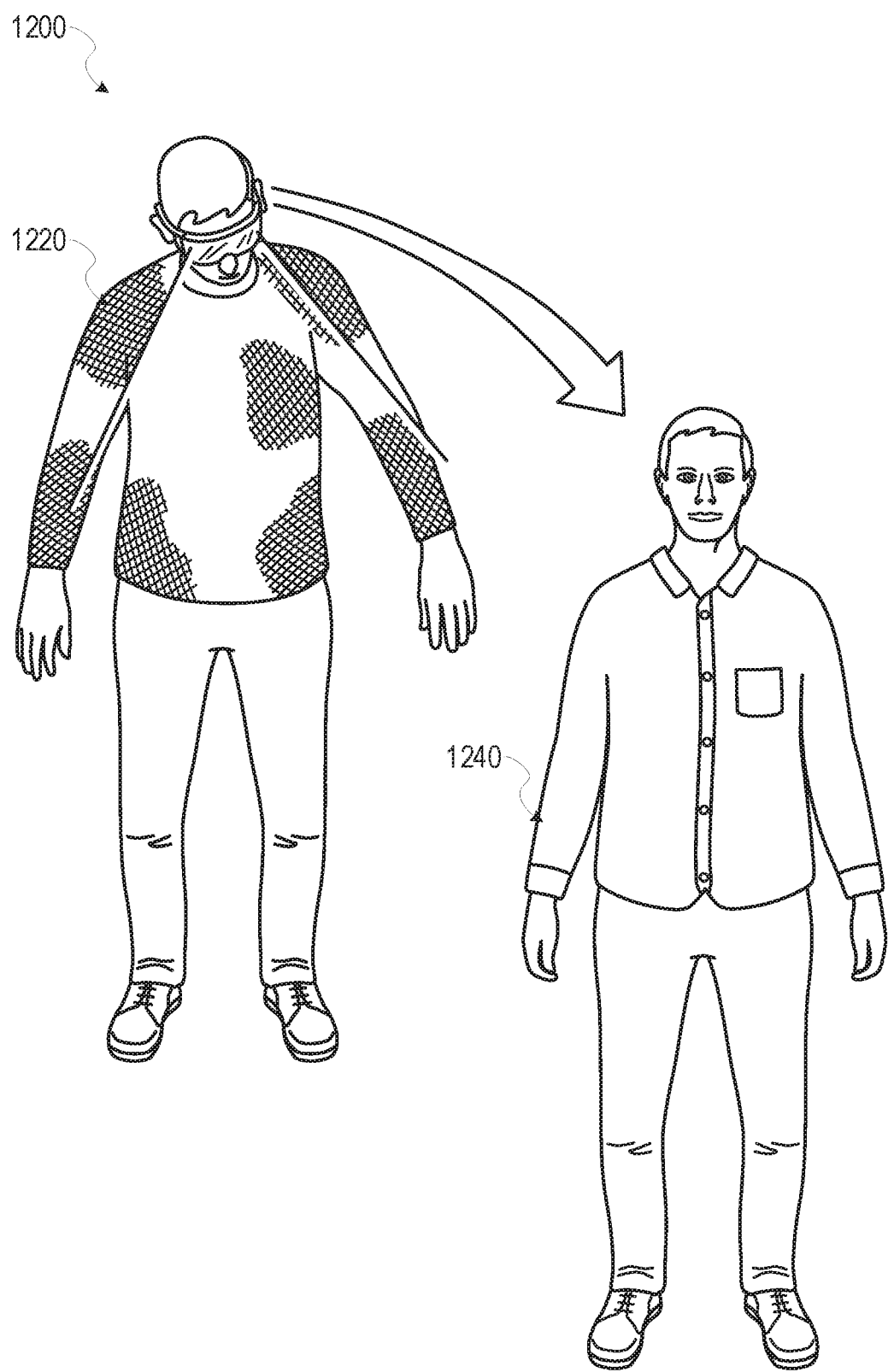
FIG. 11 is an illustration depicting one example embodiment of a touch simulation system according to one example embodiment.

FIG. 11 is an illustration 1100 depicting one example embodiment of a touch simulation system according to one example embodiment. In this example embodiment, the person 106 is wearing a body touch suit.

In one example embodiment, a representation of the person 106 in a virtual environment puts on an article of apparel according to movements by the person 106 in the physical world. In one example, the user is putting on a shirt. In this example, as the person 106 slides the virtual shirt on, the virtual environment server 152 generates touch indicators that indicate where the shirt is touching the person 106. As the command module 340 generates the commands to implement the touches, and the execution module executes the commands, the body suit will touch the person 106 accordingly and the person 106 will feel as though they are really putting on the shirt that is in the virtual environment. In this way, a person 106 may try virtually try on an article of apparel.

Figure 12:
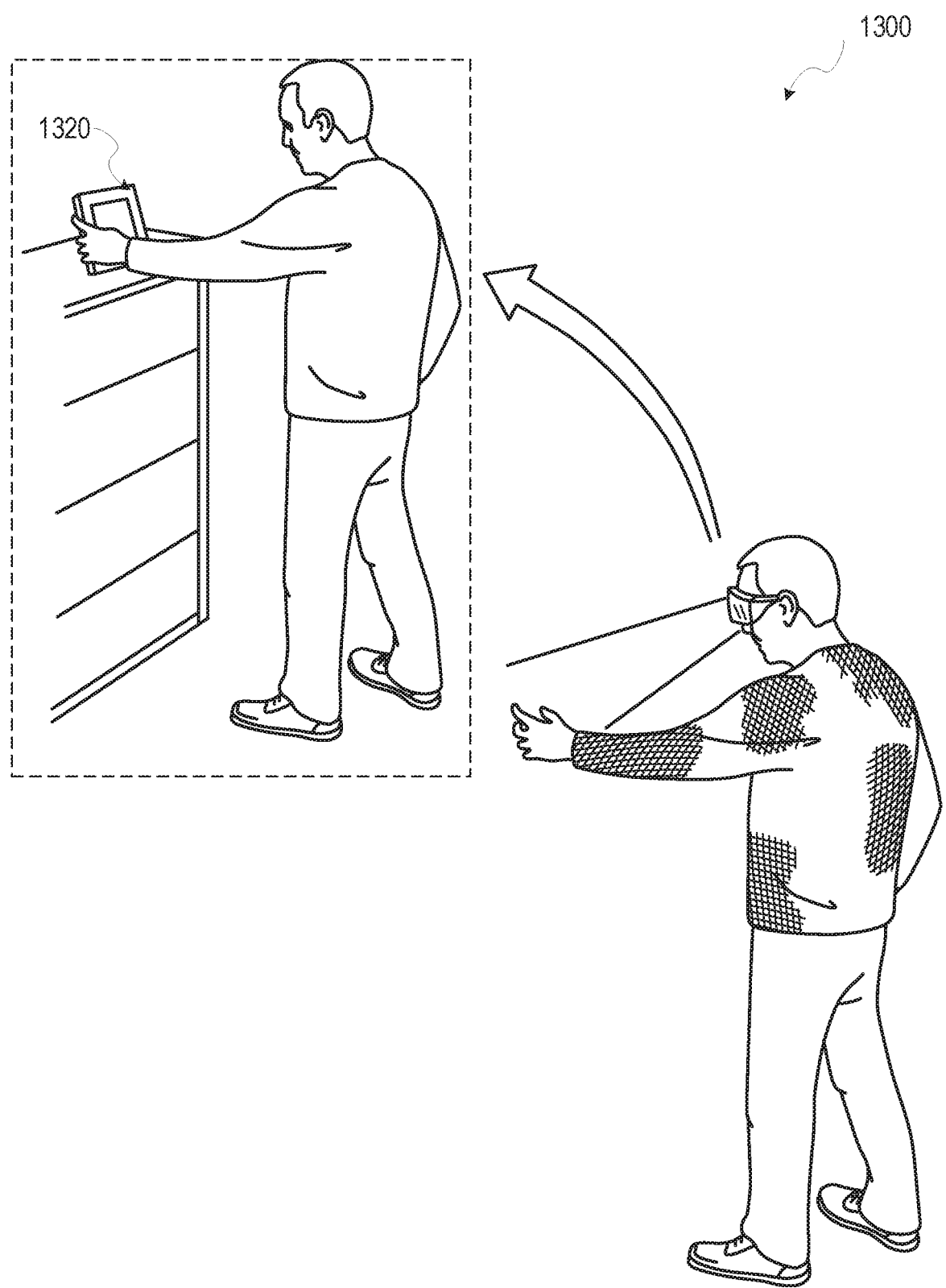
FIG. 12 is an illustration depicting one example embodiment of a touch simulation system.

FIG. 12 is an illustration 1200 depicting one example embodiment of a touch simulation system. In one example, a virtual environment includes an item that is available for purchase. A person 106 interacting with the virtual environment via the virtual environment server 152 may cause a representation of the person 106 to touch the item.

In response, the virtual environment server 152 transmits a touch indicator to the virtual module 320 that includes a location of the touch and a texture of the touch. In this example, the location of the touch is on the fingertips of the left hand and the texture of the touch is wood.

In response, the command module 340 generates a command that causes the micro-touch simulators at the tips of the fingers of the left hand to contact the person's 106 fingers according to the wood pattern. In this way, the person 106 may feel how the frame 1320 feels virtually. Such a scenario may make it much more convenient for a person 106 to virtually handle items for sale at remote locations before deciding to purchase the items.

Figure 13:
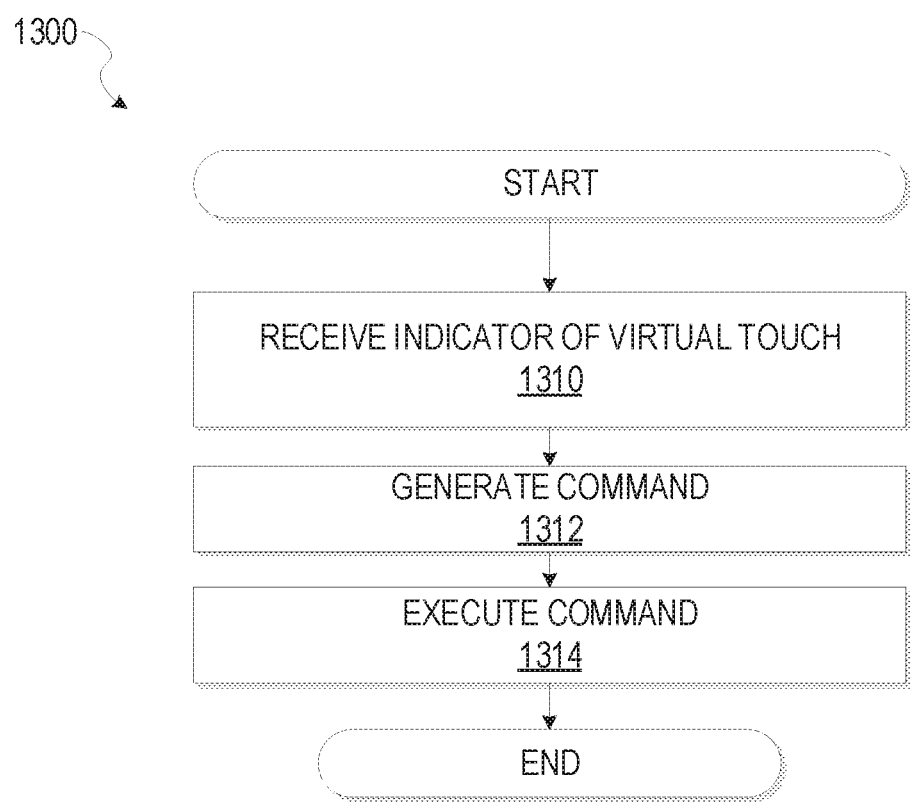
FIG. 13 is a flow chart diagram illustrating a method for simulating a virtual touch according to one example embodiment.

FIG. 13 is a flow chart diagram illustrating a method 1300 for simulating a virtual touch according to one example embodiment. Operations in the method 1300 may be performed by the system 150, using modules described above with respect to FIG. 3. As shown in FIG. 13, the method 1300 includes operations 1310, 1312, and 1314.

In one example embodiment, the method 1300 begins and at operation 1310, the virtual module receives an indicator of a touch in a virtual environment. In another example embodiment, the indicator includes a physical touch location and a texture of the touch.

The method 1300 continues at operation 1312 and the command module 340 generates one or more commands to simulate the texture of the touch at the physical touch location by stimulating one or more micro-touch simulators in an array of micro-touch simulators according to the texture of the touch at the physical touch location. In one example embodiment, the micro-touch simulators operate as part of a physical touch interface for a user of the virtual environment. In one example embodiment, the physical touch interface is an article of apparel as described herein.

The method 1300 continues at operation 1314 and the execution module 360 executes the one or more commands at the physical touch interface to simulate the touch at the physical touch location for the person 106.

Figure 14:
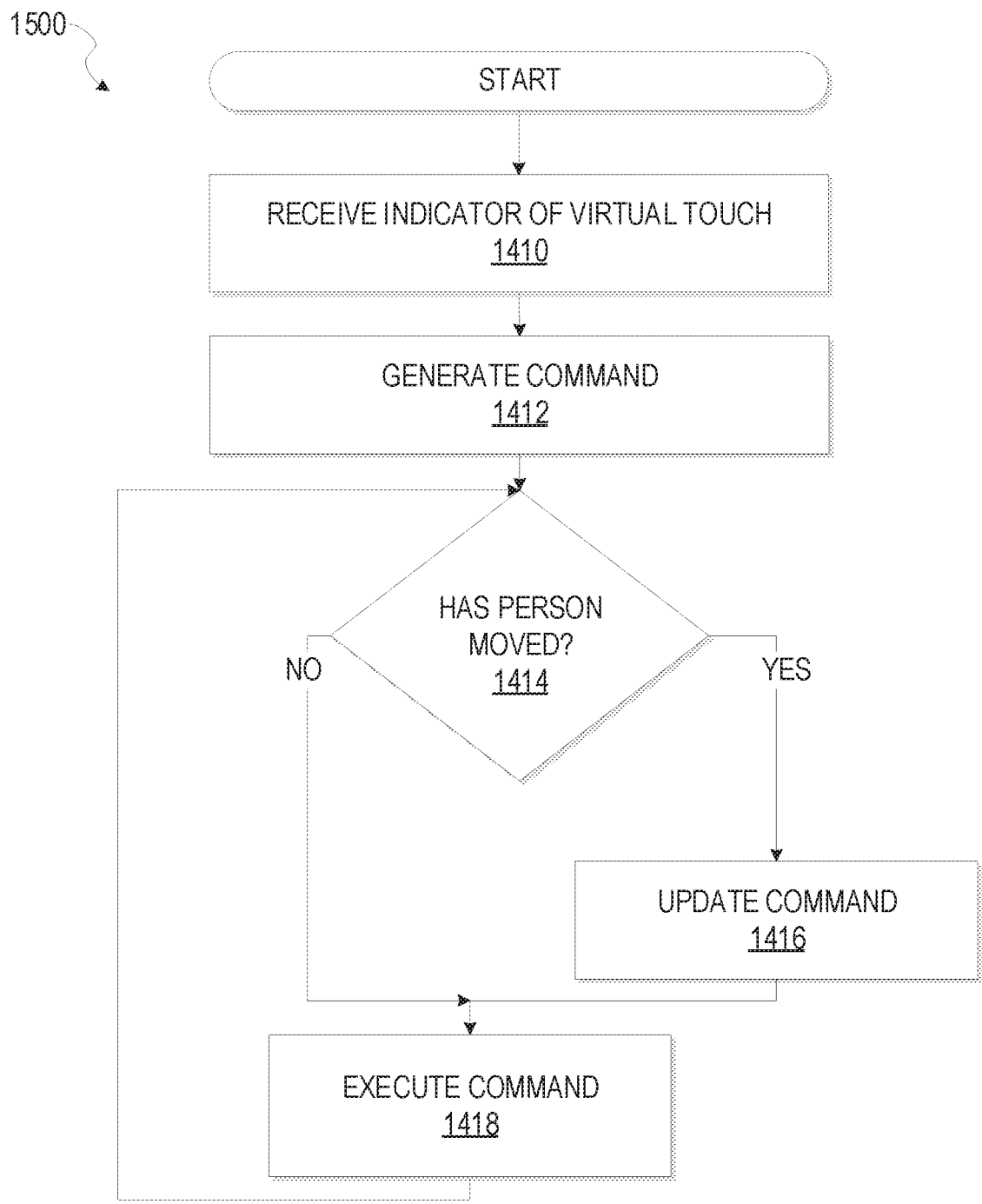
FIG. 14 is a flow chart diagram illustrating another method for simulating a virtual touch, according to one example embodiment.

FIG. 14 is a flow chart diagram illustrating another method 1400 for simulating a virtual touch, according to one example embodiment. Operations in the method 1400 may be performed by the system 150, using modules described above with respect to FIG. 3. As shown in FIG. 14, the method 1400 includes operations 1410, 1412, 1414, 1416, and 1418.

In one example embodiment, the method 1400 begins and at operation 1410, the virtual module receives an indicator of a touch in a virtual environment. In another example embodiment, the indicator includes a physical touch location and a texture of the touch.

The method 1400 continues at operation 1412 and the command module 340 generates a command to simulate the texture of the touch at the physical touch location by moving one or more micro-touch simulators in an array of micro-touch simulators according to the texture of the touch at the physical touch location. In one example embodiment, the micro-touch simulators operate as part of a physical touch interface for a user of the virtual environment. In one example embodiment, the physical touch interface is an article of apparel as described herein.

The method 1400 continues at operation 1414 and the virtual module 320 determines whether the person 106 has moved away from the touch so that the touch no longer reflects the state of objects in the virtual environment. In one example, the virtual module 320 receives an indicator from the virtual environment server 152 indicating that the touch is no longer valid.

In response to the person 106 not having moved, the method continues at operation 1418 and the execution module 360 executes the command to simulate the touch at the physical touch location for the person 106. The method 1400 then continues at operation 1414.

In response to the person 106 moving, the method 1400 continues at operation 1416 and the command module 340 updates the command to reflect a change in the touch. In one example, the virtual module 320 receives an indicator from a virtual environment server 152 that updates the status of the touch. The method 1400 then continues at operation 1418.

Machine and Software Architecture

The modules, methods, applications and so forth described in conjunction with FIGS. 1-14 are implemented in some embodiments in the context of a machine and associated software architecture. The sections below describe representative software architecture(s) and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the invention in different contexts from the disclosure contained herein.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 15:
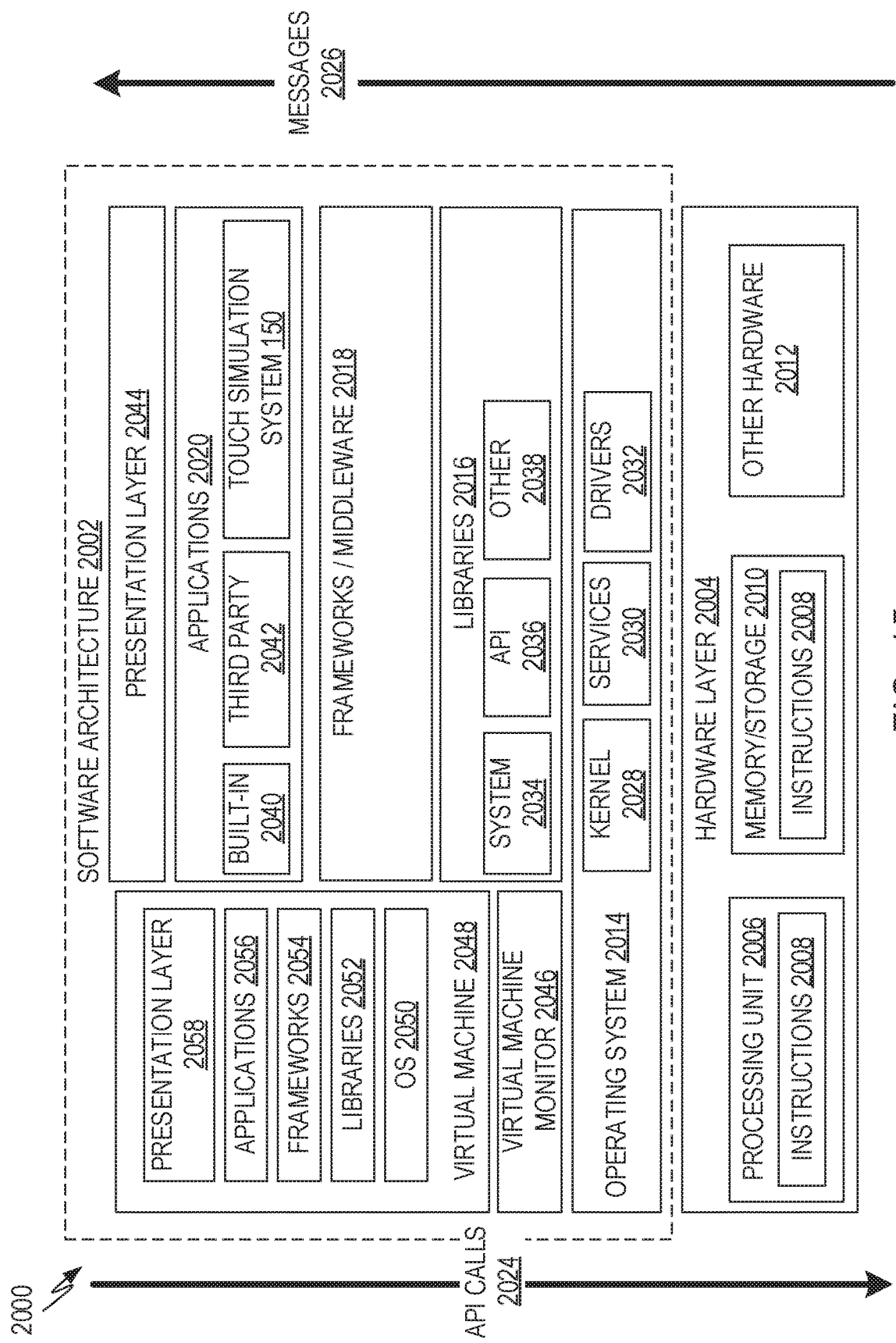
FIG. 15 is a block diagram illustrating an example of a software architecture that may be installed on a machine, according to some example embodiments.

FIG. 15 is a block diagram illustrating an example of a software architecture 2000 that may be installed on a machine, according to some example embodiments. The software architecture 2000 may be used in conjunction with various hardware architectures herein described. FIG. 15 is merely a non-limiting example of a software architecture and it will be appreciated that many other architectures may be implemented to facilitate the functionality described herein. The software architecture 2000 may be executing on hardware such as machine 2100 of FIG. 16 that includes, among other things, processors 2110, memory 2130, and I/O components 2150. A representative hardware layer 2004 is illustrated and can represent, for example, the machine 2100 of FIG. 16. The representative hardware layer 2004 comprises one or more processing units 2006 having associated executable instructions 2008. Executable instructions 2008 represent the executable instructions of the software architecture 2002, including implementation of the methods, modules, and so forth of FIG. 3. Hardware layer 2004 also includes memory and/or storage modules 2010, which also have executable instructions 2008. Hardware layer 2004 may also comprise other hardware as indicated by 2012, which represents any other hardware of the hardware layer 2004, such as the other hardware illustrated as part of machine 2100.

In the example architecture of FIG. 15, the software 2002 may be conceptualized as a stack of layers where each layer provides particular functionality. For example, the software 2002 may include layers such as an operating system 2014, libraries 2016, frameworks/middleware 2018, applications 2020, and presentation layer 2022. Operationally, the applications 2020 and/or other components within the layers may invoke API calls 2024 through the software stack and receive a response, returned values, and so forth illustrated as messages 2026 in response to the API calls 2024. The layers illustrated are representative in nature and not all software architectures have all layers. For example, some mobile or special purpose operating systems may not provide a frameworks/middleware layer 2018, while others may provide such a layer. Other software architectures may include additional or different layers.

The operating system 2014 may manage hardware resources and provide common services. The operating system 2014 may include, for example, a kernel 2028, services 2030, and drivers 2032. The kernel 2028 may act as an abstraction layer between the hardware and the other software layers. For example, the kernel 2028 may be responsible for memory management, processor management (e.g., scheduling), component management, networking, security settings, and so on. The services 2030 may provide other common services for the other software layers. The drivers 2032 may be responsible for controlling or interfacing with the underlying hardware. For instance, the drivers 2032 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 2016 may provide a common infrastructure that may be utilized by the applications 2020 and/or other components and/or layers. In one specific embodiment, the virtual module 320, the command module 340, and the execution module 360 are implemented as an application 2020. The libraries 2016 typically provide functionality that allows other software modules to perform tasks in an easier fashion than to interface directly with the underlying operating system 2014 functionality (e.g., kernel 2028, services 2030 and/or drivers 2032). The libraries 2016 may include system 2034 libraries (e.g., C standard library) that may provide functions such as memory allocation functions, string manipulation functions, mathematic functions, and the like. In addition, the libraries 2016 may include API libraries 2036 such as media libraries (e.g., libraries to support presentation and manipulation of various media format such as MPEG4, H.264, MP3, AAC, AMR, JPG, PNG), graphics libraries (e.g., an OpenGL framework that may be used to render two-dimensional and/or three dimensional graphic content on a display), database libraries (e.g., SQLite that may provide various relational database functions), web libraries (e.g., WebKit that may provide web browsing functionality), and the like. The libraries 2016 may also include a wide variety of other libraries 2038 to provide many other APIs to the applications 2020 and other software components/modules.

The frameworks 2018 (also sometimes referred to as middleware) may provide a higher-level common infrastructure that may be utilized by the applications 2020 and/or other software components/modules. For example, the frameworks 2018 may provide various graphic user interface (GUI) functions, high-level resource management, high-level location services, and so forth. The frameworks 2018 may provide a broad spectrum of other APIs that may be utilized by the applications 2020 and/or other software components/modules, some of which may be specific to a particular operating system or platform. In one example embodiment, at least a portion of the touch simulation system 150 is implemented as middleware.

The applications 2020 include built-in applications 2040 and/or third party applications 2042. Examples of representative built-in applications 2040 may include, but are not limited to, a contacts application, a browser application, a book reader application, a location application, a media application, a messaging application, and a game application, or other, or the like. Third party applications 2042 may include any of the built in applications as well as a broad assortment of other applications. In a specific example, the third party application 2042 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2042 may invoke the API calls 2024 provided by the mobile operating system such as operating system 2014 to facilitate functionality described herein.

The applications 2020 may utilize built in operating system functions (e.g., kernel 2028, services 2030, and/or drivers 2032), libraries (e.g., system 2034, APIs 2036, and other libraries 2038), frameworks/middleware 2018 to create user interfaces to interact with users of the system. Alternatively, or additionally, in some systems, interactions with a user may occur through a presentation layer, such as presentation layer 2044. In these systems, the application/module "logic" can be separated from the aspects of the application/module that interact with a user.

Figure 16:
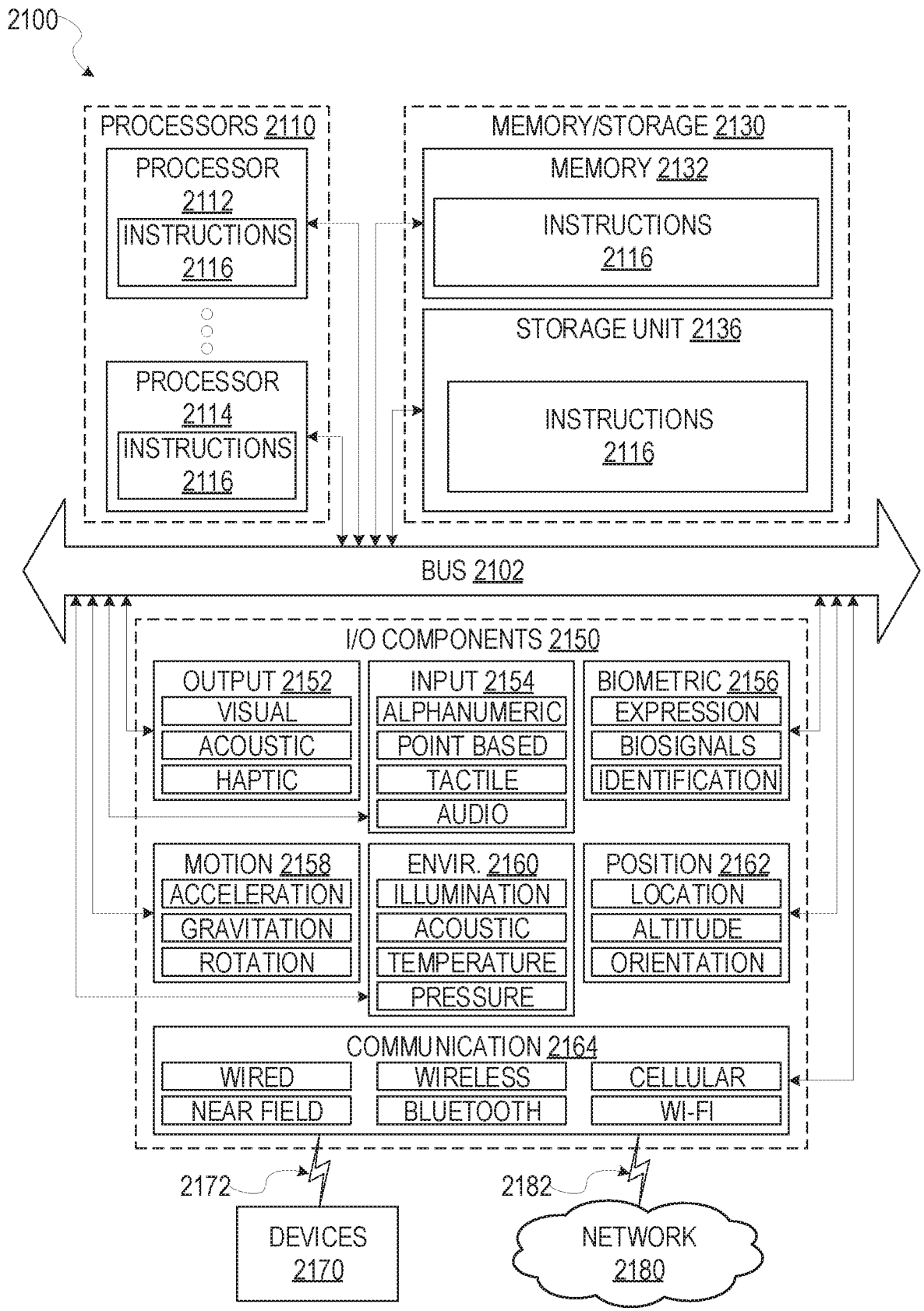
FIG. 16 illustrates a diagrammatic representation of a machine in the form of a computer system within which a set of instructions may be executed for causing the machine to perform any one or more of the methodologies discussed herein, according to an example embodiment.

Some software architectures utilize virtual machines. In the example of FIG. 15, this is illustrated by virtual machine 2048. A virtual machine creates a software environment where applications/modules can execute as if they were executing on a hardware machine (such as the machine of FIG. 16, for example). A virtual machine is hosted by a host operating system (operating system 2014 in FIG. 15) and typically, although not always, has a virtual machine monitor 2046, which manages the operation of the virtual machine as well as the interface with the host operating system (i.e., operating system 2014). A software architecture executes within the virtual machine such as an operating system 2050, libraries 2052, frameworks/middleware 2054, applications 2056 and/or presentation layer 2058. These layers of software architecture executing within the virtual machine 2048 can be the same as corresponding layers previously described or may be different Example Machine Architecture and Machine-Readable Medium FIG. 16 is a block diagram illustrating components of a machine 2100, according to some example embodiments, able to read instructions from a machine-readable medium (e.g., a machine-readable storage medium) and perform any one or more of the methodologies discussed herein. Specifically, FIG. 16 shows a diagrammatic representation of the machine 2100 in the example form of a computer system, within which instructions 2116 (e.g., software, a program, an application, an applet, an app, or other executable code) for causing the machine 2100 to perform any one or more of the methodologies discussed herein may be executed.

For example the instructions may cause the machine to execute the flow diagrams of FIGS. 13-14. Additionally, or alternatively, the instructions may implement the modules depicted in FIG. 3. Specifically, the instructions 2116 may implement the various functions of the virtual module 320, the command module 340, and the execution module 360.

The instructions transform the general, non-programmed machine into a particular machine programmed to carry out the described and illustrated functions in the manner described. In alternative embodiments, the machine 2100 operates as a standalone device or may be coupled (e.g., networked) to other machines. In a networked deployment, the machine 2100 may operate in the capacity of a server machine or a client machine in a server-client network environment, or as a peer machine in a peer-to-peer (or distributed) network environment. The machine 2100 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2116, sequentially or otherwise, that specify actions to be taken by machine 2100. Further, while only a single machine 2100 is illustrated, the term "machine" shall also be taken to include a collection of machines 2100 that individually or jointly execute the instructions 2116 to perform any one or more of the methodologies discussed herein.

The machine 2100 may include processors 2110, memory 2130, and I/O components 2150, which may be configured to communicate with each other such as via a bus 2102. In an example embodiment, the processors 2110 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 2112 and processor 2114 that may execute instructions 2116. The term "processor" is intended to include multi-core processor that may comprise two or more independent processors (sometimes referred to as "cores") that may execute instructions contemporaneously. Although FIG. 16 shows multiple processors, the machine 2100 may include a single processor with a single core, a single processor with multiple cores (e.g., a multi-core process), multiple processors with a single core, multiple processors with multiples cores, or any combination thereof.

The memory/storage 2130 may include a memory 2132, such as a main memory, or other memory storage, and a storage unit 2136, both accessible to the processors 2110 such as via the bus 2102. The storage unit 2136 and memory 2132 store the instructions 2116 embodying any one or more of the methodologies or functions described herein. The instructions 2116 may also reside, completely or partially, within the memory 2132, within the storage unit 2136, within at least one of the processors 2110 (e.g., within the processor's cache memory), or any suitable combination thereof, during execution thereof by the machine 2100. Accordingly, the memory 2132, the storage unit 2136, and the memory of processors 2110 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 2116. The term "machine-readable medium" shall also be taken to include any medium, or combination of multiple media, that is capable of storing instructions (e.g., instructions 2116) for execution by a machine (e.g., machine 2100), such that the instructions, when executed by one or more processors of the machine 2100 (e.g., processors 2110), cause the machine 2100 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 2150 may include a wide variety of components to receive input, provide output, produce output, transmit information, exchange information, capture measurements, and so on. The specific I/O components 2150 that are included in a particular machine will depend on the type of machine. For example, portable machines such as mobile phones will likely include a touch input device or other such input mechanisms, while a headless server machine will likely not include such a touch input device. It will be appreciated that the I/O components 2150 may include many other components that are not shown in FIG. 16. The I/O components 2150 are grouped according to functionality merely for simplifying the following discussion and the grouping is in no way limiting. In various example embodiments, the I/O components 2150 may include output components 2152 and input components 2154. The output components 2152 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 2154 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 2150 may include biometric components 2156, motion components 2158, environmental components 2160, or position components 2162 among a wide array of other components. For example, the biometric components 2156 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2158 may include acceleration sensor components (e.g., accelerometer), gravitation sensor components, rotation sensor components (e.g., gyroscope), and so forth. The environmental components 2160 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 2162 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2150 may include communication components 2164 operable to couple the machine 2100 to a network 2180 or devices 2170 via coupling 2182 and coupling 2172, respectively. For example, the communication components 2164 may include a network interface component or other suitable device to interface with the network 2180. In further examples, communication components 2164 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2170 may be another machine or any of a wide variety of peripheral devices (e.g., a peripheral device coupled via a USB).

Moreover, the communication components 2164 may detect identifiers or include components operable to detect identifiers. For example, the communication components 2164 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2164, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2180 may be an ad hoc network, an intranet, an extranet, a VPN, a LAN, a WLAN, a WAN, a WWAN, a (MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 2180 or a portion of the network 2180 may include a wireless or cellular network and the coupling 2182 may be a Code Division Multiple Access (CDMA) connection, a Global System for Mobile communications (GSM) connection, or other type of cellular or wireless coupling. In this example, the coupling 2182 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 2116 may be transmitted or received over the network 2180 using a transmission medium via a network interface device (e.g., a network interface component included in the communication components 2164) and utilizing any one of a number of well-known transfer protocols (e.g., hypertext transfer protocol (HTTP)). Similarly, the instructions 2116 may be transmitted or received using a transmission medium via the coupling 2172 (e.g., a peer-to-peer coupling) to devices 2170. The term "transmission medium" shall be taken to include any intangible medium that is capable of storing, encoding, or carrying instructions 2116 for execution by the machine 2100, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system, comprising:
one or more circuits configured to:
receive an indicator of a sensed touch in a virtual environment, the indicator identifying a texture of touch to be simulated;
determine, based on the indicator, an area of the sensed touch;
retrieve, from a database of a plurality of textures, a touch texture corresponding to the texture of touch identified by the indicator, the database storing a level of each of the plurality of textures; and
generate, according to the retrieved touch texture, a simulated touch by applying a field to one or more touch simulators corresponding to the determined area of the sensed touch, the field actuating the one or more touch simulators by linearly displacing an element of the one or more touch simulators.

2. They system of claim 1, wherein the one or more touch simulators operate as a touch interface for a user of the virtual environment, and to generate the simulated touch is to apply the field to at least one touch simulator located at an area of the touch interface corresponding to the area of the sensed touch.

3. The system of claim 1, wherein the one or more circuits are further configured to position equally spaced ones of the one or more touch simulators at different heights to generate the simulated touch according to the retrieved touch texture, wherein the heights are adjusted based on the retrieved touch texture.

4. The system of claim 1, wherein:
the one or more circuits are further configured to determine a magnitude of the sensed touch, and simulate pinching by activating two or more of the one or more touch simulators that are within a threshold distance of each other; and
the field actuates the one or more touch simulators according to the magnitude of the sensed touch in the area of the sensed touch.

5. The system of claim 1, wherein the one or more touch simulators are configured in an article of clothing, and linearly displacing the element of the one or more touch simulators to causes the element to contact the skin of a user that wears the article, and wherein the one or more circuits are further configured to map a location in the virtual environment corresponding to a person represented in the virtual environment with a corresponding location on an article of apparel that includes the one or more touch simulators.

6. The system of claim 5, wherein the sensed touch comprises the user donning the article of clothing, the simulated touch corresponding to a texture of the clothing, the area of the sensed touch comprising one or more areas where the article of clothing touches the user in the virtual environment.

7. The system of claim 1, wherein the one or more circuits are further configured to send current to a micro-sphere to apply a temperature to an area of the sensed touch.

8. The system of claim 1, wherein the sensed touch comprises a user touching a virtual item corresponding to a physical item that is available for purchase.

9. The system of claim 1, wherein:
the one or more touch simulators are disposed in an array,
each of the one or more touch simulators comprise one more charged micro-spheres, and
the array further comprises insulators between the microspheres enabling the system to effectuate each microsphere independently.

10. A method, comprising:
receiving data indicative of a sensed touch in a virtual environment, the data identifying a texture of touch to be simulated;
determining, based on the received data, an area of the sensed touch;
retrieving, from a database of a plurality of textures, a touch texture corresponding to the texture of touch identified by the data, the database storing a level of each of the plurality of textures; and
simulating, according to the retrieved touch texture, a virtual touch by applying an electric-field to one or more touch simulators corresponding to the determined area of the sensed touch, the electric-field moving the one or more touch simulators by displacing an element of the one or more touch simulators.

11. The method of claim 10, wherein the electric-field displaces the element of the one or more touch simulators a distance proportional to a force of the sensed touch.

12. The method of claim 10, wherein the one or more touch simulators operate as a touch interface for a user of the virtual environment, and simulating the virtual touch comprises applying the electric-field to at least one touch simulator located at an area of the touch interface corresponding to the area of the sensed touch.

13. The method of claim 10, further comprising determining a magnitude of the sensed touch, wherein the electric-field actuates the one or more touch simulators according to the magnitude of the sensed touch in the area of the sensed touch.

14. The method of claim 10, wherein the one or more touch simulators are configured in an article of clothing, and displacing the element of the one or more touch simulators comprises causing the element to contact the skin of a user that wears the article.

15. The method of claim 14, wherein the sensed touch comprises the user donning the article of clothing, the simulated touch corresponding to a texture of the clothing, the area of the sensed touch comprising one or more areas where the article of clothing touches the user in the virtual environment.

16. A device, comprising:
an article of clothing; and
an array of one or more touch simulators embedded in the article of clothing, at least one touch simulator of the one or more touch simulator comprising:
a charged element comprising a microsphere,
an insulator configured to insulate a charged microsphere from another charged microsphere, and
at least two electrodes to receive a command signal to simulate a touch by moving the charged element in the insulator using a field generated according to the command signal, the simulated touch corresponding to a sensed touch in a virtual environment, the command signal being generated by retrieving, from a database of a plurality of textures, a touch texture corresponding to texture of touch to be simulated, the database storming a level of each of the plurality of textures.

17. The device of claim 16, wherein the sensed touch comprises a user donning the article of clothing, the command signal configured to position equally spaced ones of the one or more touch simulators at different heights to generate the simulated touch according to the retrieved touch texture, wherein the heights are adjusted based on the retrieved touch texture.

18. The device of claim 16, wherein the field generated according to the command signal moves the charged element in the insulator according to at least one of a magnitude of the sensed touch, a force of the sensed touch, or a texture of the sensed touch.

19. The device of claim 16, wherein the charged element is a magnetic cylinder, the field generated according to the command signal comprises an electro-magnetic field applied to the magnetic cylinder causing a displacement of the magnetic cylinder.

20. The device of claim 16, wherein the charged element is a micro-sphere, the field generated according to the command signal comprises an electro-magnetic field applied to the micro-sphere causing a displacement of the microsphere.

* * * * *